(12) United States Patent
Mu et al.

(10) Patent No.: US 11,961,308 B2
(45) Date of Patent: Apr. 16, 2024

(54) CAMERA BLOCKAGE DETECTION FOR AUTONOMOUS DRIVING SYSTEMS

(71) Applicant: NVIDIA CORPORATION, Santa Clara, CA (US)

(72) Inventors: Xiaoyan Mu, Shanghai (CN); Xiaohan Hu, Shanghai (CN)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 18/105,229

(22) Filed: Feb. 2, 2023

(65) Prior Publication Data
US 2023/0186639 A1 Jun. 15, 2023

Related U.S. Application Data

(63) Continuation of application No. 16/995,831, filed on Aug. 18, 2020, now Pat. No. 11,574,481, which is a
(Continued)

(51) Int. Cl.
*G06V 20/56* (2022.01)
*G05D 1/00* (2006.01)
(Continued)

(52) U.S. Cl.
CPC ........... *G06V 20/56* (2022.01); *G05D 1/0088* (2013.01); *G05D 1/0246* (2013.01); *G06T 7/70* (2017.01); *G06V 10/50* (2022.01); *G06V 10/993* (2022.01)

(58) Field of Classification Search
CPC ...... G06V 20/56; G06V 10/50; G06V 10/993; G05D 1/0088; G05D 1/0246; G06T 7/70; G06F 18/00
(Continued)

(56) References Cited

U.S. PATENT DOCUMENTS 8,243,166 B2 8/2012 Kumar et al.
9,773,177 B2 9/2017 Takemura et al.
(Continued)

FOREIGN PATENT DOCUMENTS

CN 103854023 A 6/2014
DE 102017122261 A1 3/2019
RO 130710 11/2015

OTHER PUBLICATIONS

Sebastien Harasse et al., "Automated Camera Dysfunctions Detection", Image Analysis and Interpretation, 6th IEEE Southwest Symposium, Mar. 28-30, 2004, pp. 36-40.
(Continued)

*Primary Examiner* — Jerome Grant, II
(74) *Attorney, Agent, or Firm* — SU IP CONSULTING

(57) ABSTRACT

Systems and methods for detecting blockages in images are described. An example method may include receiving a plurality of images captured by a camera installed on an apparatus. The method may include identifying one or more candidate blocked regions in the plurality of images. Each of the candidate blocked regions may contain image data caused by blockages in the camera's field-of-view. The method may further include assigning scores to the one or more candidate blocked regions based on relationships among the one or more candidate blocked regions in the plurality of images. In response to a determination that one of the scores is above a predetermined blockage threshold, the method may include generating an alarm signal for the apparatus.

20 Claims, 7 Drawing Sheets

Related U.S. Application Data continuation of application No. 16/181,366, filed on Nov. 6, 2018, now Pat. No. 10,769,454.

(60) Provisional application No. 62/582,881, filed on Nov. 7, 2017.

(51) Int. Cl.
*G06T 7/70* (2017.01)
*G06V 10/50* (2022.01)
*G06V 10/98* (2022.01)

(58) Field of Classification Search
USPC .......................................................... 382/103
See application file for complete search history.

(56) References Cited

U.S. PATENT DOCUMENTS

| | | | |
|---|---|---|---|
| 10,769,454 B2 | 9/2020 | Mu et al. | |
| 11,226,687 B2 | 1/2022 | Lopez Gil et al. | |
| 11,574,481 B2 * | 2/2023 | Mu | G06T 7/70 |
| 2015/0309165 A1 | 10/2015 | Elwart et al. | |
| 2016/0379067 A1 | 12/2016 | May et al. | |
| 2019/0283756 A1 | 9/2019 | Leonard et al. | |
| 2019/0315368 A1 | 10/2019 | Shen et al. | |
| 2020/0086789 A1 | 3/2020 | Nowakowski et al. | |
| 2020/0086791 A1 | 3/2020 | Hardy | |

OTHER PUBLICATIONS

Gang Cao et al., "Edge-based Blur Metric for Tamper Detection", Journal of Information Hiding and Multimedia Signal Processing, Jan. 2010, pp. 20-27, vol. 1, No. 1.

Hanghang Tong et al., "Blur Detection for Digital Images Using Wavelet Transform", Multimedia and Expo, ICME 04, IEEE International Conference, Jun. 27-30, 2004, pp. 17-20, vol. 1.

Gil-Beom Lee et al., "Unified Camera Tamper Detection Based on Edge and Object Information", Sensors, 2015, pp. 10315-10331, vol. 15.

Cesare Alippi et al., "Detecting External Disturbances on Camera lens in Wireless Multimedia Sensor Networks", IEEE Transactions on Instrumentation and Measurement, Nov. 2010, vol. 5, No. 11.

Alexandros Gavriilidis et al., "Sensor System Blockage Detection for Night Time Headlight Control Based on Camera and Radar Sensor Information", 15th International IEEE Conference on Intelligent Transportation Systems Anchorage, Sep. 16-19, 2012.

Anil Aksay et al., "Camera Tamper Detection Using Wavelet Analysis for Video Surveillance", Conference Paper, Oct. 2007, IEEE Xplore.

Cesare Alippi et al., "Just-in-Time Adaptive Classifiers", retrieve from the website: http://citeseerx.ist.psu.edu/ viewdoc/download?doi=10.1.1.108.6657&rep=rep1&type=pdf on Sep. 13, 2018.

Hadjhamma Tadjine et al., "Optical Self Diagnostics for Camera Based Driver Assistance", Proceedings of the FISITA 2012 World Automotive Congress, Lecture Notes in Electrical Engineering 19, 2012, p. 507-p. 518, Springer, Berlin, Heidelberg.

Vivek Akkala et al., Lens Adhering Contaminant Detection Using Spatio-Temporal Blur, 2016 International Conference on Signal Processing and Communications (SPCOM), IEEE, 2016.

* cited by examiner

Road Surface
611

Image with Blockage
610

Blockage
613

Waveforms based on Feature values v. Time
620

CAMERA BLOCKAGE DETECTION FOR AUTONOMOUS DRIVING SYSTEMS

CROSS-REFERENCE TO RELATED APPLICATIONS

The present application is a continuation application under 35 U.S.C. § 120 of U.S. application Ser. No. 16/995,831, filed Aug. 18, 2020, now U.S. Pat. No. 11,574,481, which is a continuation application under 35 U.S.C. § 120 of Ser. No. 16/181,366 filed Nov. 6, 2018, now U.S. Pat. No. 10,769,454, which claims the benefit of the U.S. Provisional Application No. 62/582,881 filed Nov. 7, 2017. The U.S. Applications and the U.S. Provisional Application are hereby incorporated by reference in their entirety.

BACKGROUND

An autonomous driving system requires precise sensor information (such as images captured by a camera installed on a vehicle) to generate reliable control signals and safely perform autonomous driving of the vehicle. When the camera's field-of-view is partially blocked, the captured images may contain a blurred region with little, if any, details. Without sufficient image details showing the surrounding environment, the autonomous driving system may not be able to determine the road and traffic conditions and cannot guarantee the safety of a self-driving vehicle. Therefore, it is crucial to quickly and accurately detect blockages in the camera's field-of-view, so that the autonomous driving system can adjust the controlling of the vehicle or provide a warning of the blockage to a human controller.

Many real-life scenarios may lead to false determinations of a camera's field-of-view being blocked. Existing approaches are generally based on a "single-image blur detection" mechanism, which may not be sufficient to detect those scenarios in which only a small portion of the camera's field-of-view is blocked. Also, existing approaches may have a high false-positive rate when the captured images inaccurately resemble a camera being blocked, given that a single image frame contains limited information. Thus, it is challenging to design a blockage detection system to achieve a high blockage detection rate and a low/zero false-positive rate.

DETAILED DESCRIPTION

Figure 1:
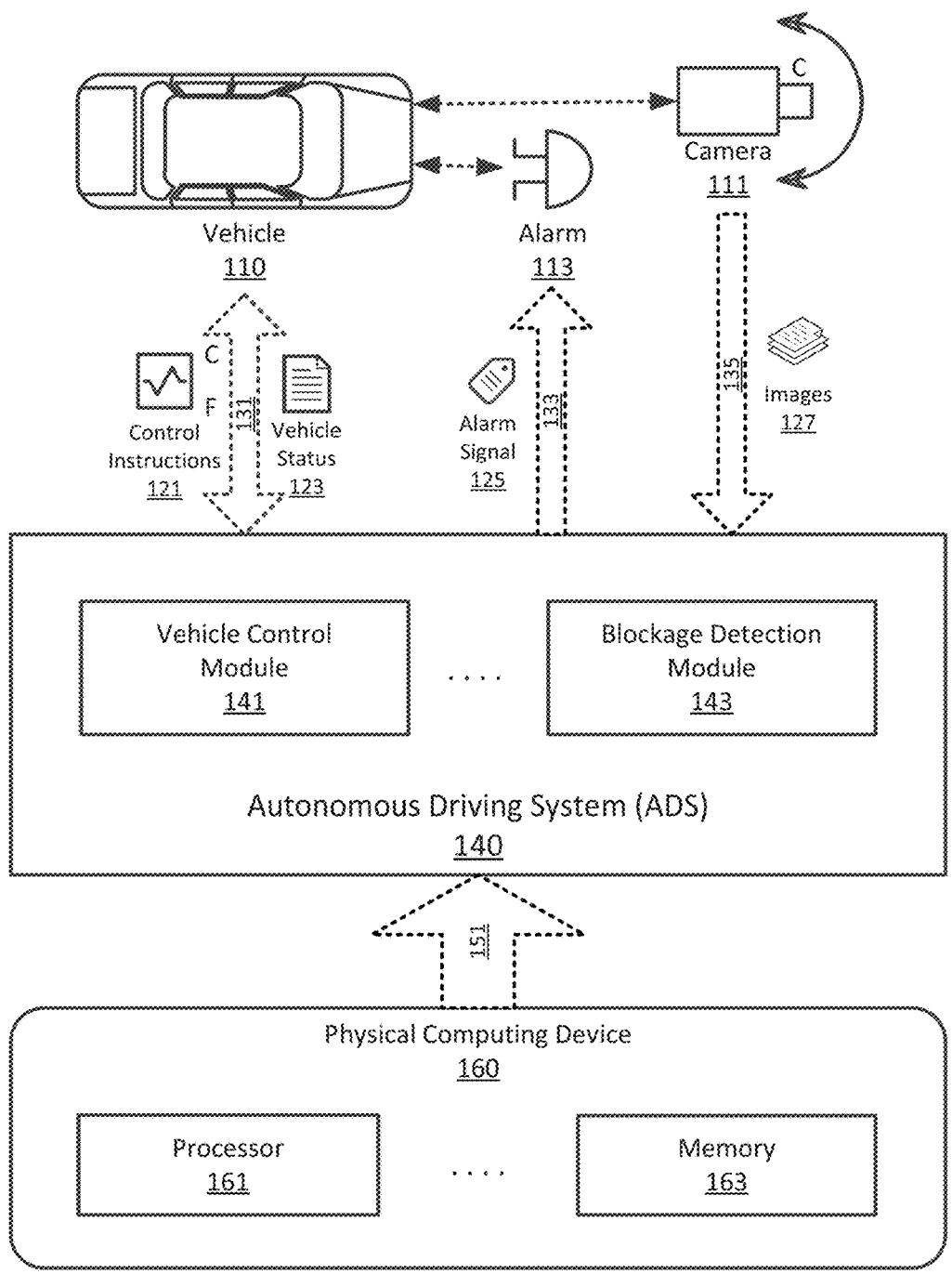
FIG. 1 illustrates a block diagram of an autonomous driving system configured to provide camera blockage detection.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

The present disclosure describes an autonomous driving system for detecting whether there are blockages in the images captured by a camera installed on a vehicle. The autonomous driving system may first evaluate each of the captured images based on the pixel values in the images, and estimate whether certain candidate blocked regions of the images may likely be caused by blockages in the field-of-view of the camera. The autonomous driving system may then eliminate those candidate blocked regions that may not be caused by camera blockages but may instead be associated with backgrounds or road surfaces. After having eliminated certain candidate blocked regions, the autonomous driving system may monitor how the remaining candidate blocked regions chronologically change or develop in the captured images. If during the monitoring, the autonomous driving system determines that a candidate blocked region is highly likely caused by a camera blockage, it may transmit an alarm signal to the vehicle, warning the driver of the vehicle about this camera blockage.

FIG. 1 illustrates a block diagram of an autonomous driving system configured to provide camera blockage detection, according to one or more embodiments of the present disclosure. In FIG. 1, an autonomous driving system (ADS) 140 may be configured to provide autonomous driving capability to a vehicle 110. The vehicle 110 may be a transportation apparatus capable of moving from one physical location to another. The vehicle 110 may be equipped with, among other devices and components, a camera 111 and an alarm 113. The camera 111 may be any electronic module/device configured to capture still images and/or videos. The alarm 113 may be an electronic component installed in the vehicle 110 for provide warning to any human/non-human controller. The alarm 113 may also be a module in a hardware/software monitor for providing status of the autonomous driving of the vehicle 110. In some embodiments, the vehicle 110 may also be any apparatus and equipment that relies on the images 127 generated by the camera 111 for operation.

In some embodiments, the ADS 140 may be configured to provide autonomous driving of the vehicle 110. The ADS 140 may include, among other modules and components, a vehicle control module 141 and a blockage detection module 143. The vehicle control module 141 may be configured to generate a set of control instructions 121 for controlling the operation of the vehicle 110. During autonomous driving of the vehicle 110, the camera 111 may continuously capture multiple still images 127 of the road and environment in front of and/or surrounding the vehicle 110. The camera 111 may also capture videos (which contain streams of images 127) of the road and environment ahead of the vehicle 110. Afterward, the camera 111 may transmit (135) the captured images and/or videos as a steam of continuous images 127 to the ADS 140.

In some embodiments, based on the images 127 received (135) from the camera 111, as well as any vehicle status information 123 received (131) from the vehicle 110, the vehicle control module 141 may process the images 127 and the vehicle status information 123, and generate a set of control instructions 121 for transmitting (131) to the vehicle 110. The vehicle 110 may then be automatically driven without human intervention based on the control instructions 121. The above process may be repeated to allow the vehicle 110 to be continuously driven.

In some embodiments, the images 127 received from the camera 111 may or may not contain blockages. For example, if the camera 111's field-of-view is partially blocked, the captured images 127 may have corresponding blocked regions that contain less information/details than the unblocked regions. Further, the patterns of the blockage regions may persist for a long period of time, thereby affecting all images 127 that are generated during this period. In this case, the blockage detection module 143 may evaluate the images 127 to determine the existence of any blockage.

In some embodiments, the blockage detection module 143 may detect blockages in the images 127 based on a pattern recognition approach. Specifically, the blockage detection module 143 may perform a feature extraction operation and a detection/classification operation using local statistical features and a spatial-temporal classifier to achieve reliable blockage detection. When the blockage detection module 143 detects blockages in the images 127, it may generate an alarm signal 125 indicative of an abnormal status (e.g., the camera 111 is blocked and the autonomous driving is no longer safe to continue). The blockage detection module 143 may then transmit (133) the generated alarm signal 125 to the alarm 113 for warning of the abnormal status.

In some embodiments, the blockage detection module 143 may detect blockages from images generated by a single camera 111. Specifically, the blockage detection module 143 may takes into account both temporal and spatial relationships among the images 127, and can detect small camera blockages based on local features. As a result, the blockage detection module 143 may achieve a very low false-positive rate, and may be implemented using independent parallel structure that is suitable for GPU implementation. Furthermore, the blockage detection module 143 may implement other local statistical feature analysis algorithms, such as the use of wavelet analysis and motion vectors, etc. The functionalities of the blockage detection module 143 are further described below.

In some embodiments, the ADS 140 (and the vehicle control module 141 and the blockage detection module 143 contained therein) may be implemented using hardware modules or software systems. For example, the blockage detection module 143 may be implemented using a programmable logic device (e.g., Field-programmable gate array, or "FPGA"), which may be an electronic module or a digital circuit that can be field-configurable after manufacturing. Alternatively, the ADS 140 and its modules may be developed based on the NVIDIA® DriveWorks® Software Development Kit (SDK), which is an Application Programming Interface (API) that is intended for the development of Autonomous Driving Systems. The ADS 140 may also be installed inside of the vehicle 110 or remotely on a server. When implemented remotely, the ADS 140 may further include communication modules to provide remote network communications (e.g., wireless or mobile network communications) between the vehicle 110 and the ADS 140.

In some embodiments, the ADS 140 may be implemented based on a physical computing device 160. The physical computing device 160 may be equipped with various "physical hardware components" such as, without limitation, one or more processors 161, memory 163, and additional electronic circuit components (e.g., storage or hard drive, Network Interface Card (NIC), all of which are not shown in FIG. 1). The processor 161, which may be a physical Central Processing Unit (CPU), a Graphic Processing Unit (GPU), or a Digital Signal Processors (DSP), may be configured to support functions of the ADS 140. The processor 161 may also be configured to utilize the memory 163 to evaluate the images 127. The memory 163 may be hardware storage devices having integrated circuits for storing information used in the ADS 140. The memory 163 may be volatile memory (e.g., dynamic random-access memory (DRAM) or CPU cache memory) and non-volatile memory (e.g., hard drive or flash memory). In some embodiments, the memory 163 may be non-transitory computer-readable storage medium, containing a set of instructions which, when executed by the processor 161, cause the processor 61 to perform a method of camera blockage detection.

Figure 2:
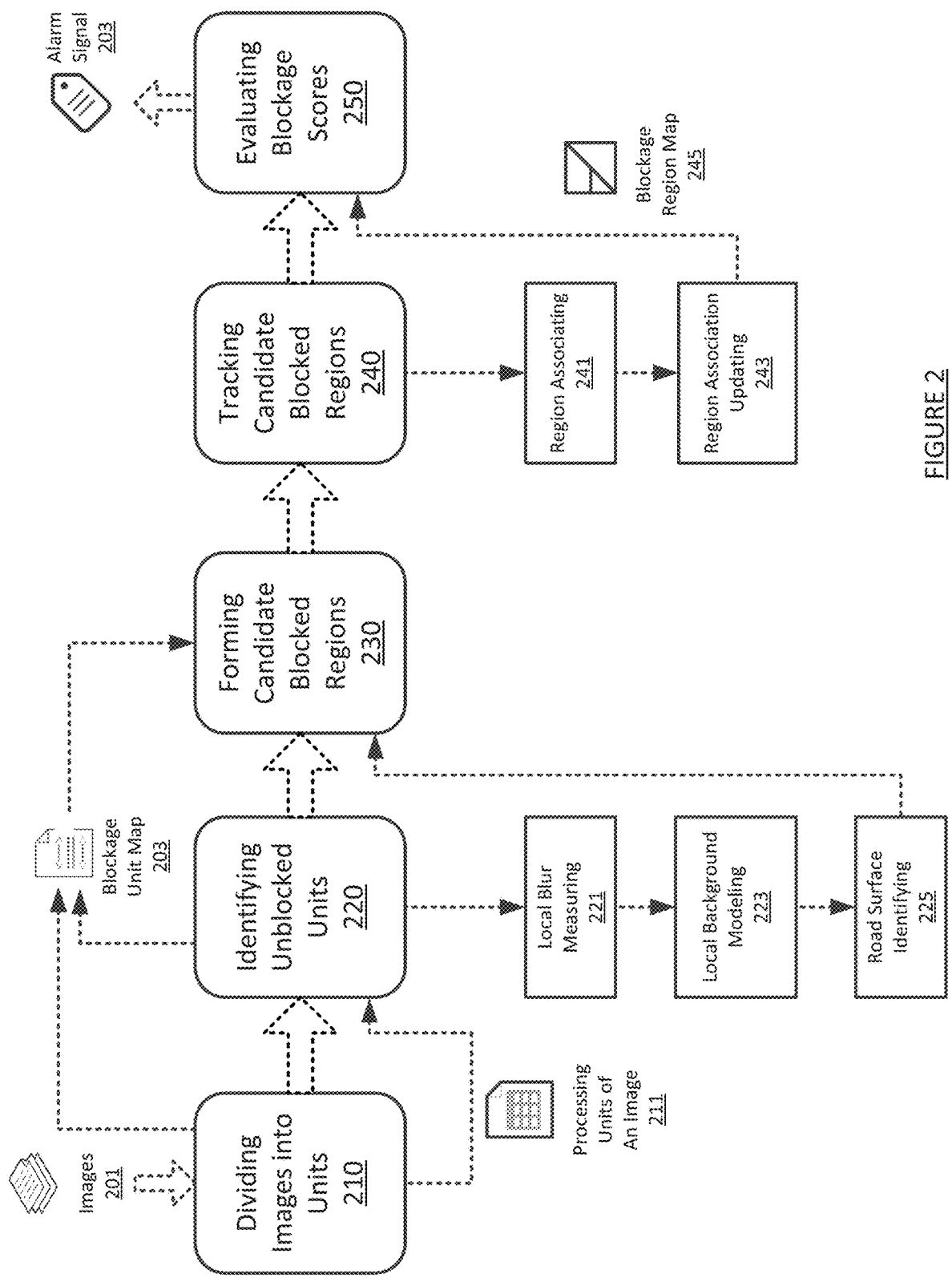
FIG. 2 illustrates a process for detecting blockages in images.

FIG. 2 illustrates a process for detecting blockages in images, in accordance with one or more embodiments of the present disclosure. In FIG. 2, a blockage detection module (similar to the blockage detection module 143 of FIG. 1) may be configured to receive a sequence of images 201 generated by a camera installed on a vehicle, perform a blockage detection process based on the images 201, and generate an alarm signal 203 when sufficient amount of blockages are detected from the images 201. Specifically, the "blockage detection process" may include at least the following operations: dividing images into units 210, identifying unblocked units 220, forming candidate blocked regions 230, tracking candidate blocked regions 240, and evaluating blockage scores 250.

In some embodiments, the blockage detection module may perform the blockage detection process on the images 201 one-by-one based on the sequential order the images 201 were originally generated. When processing one specific image 201 ("current image"), the blockage detection module may also utilize any images in the received images 201 that are captured prior to the current image (collectively "prior images"). In other words, the blockage detection module may use the current image for spatial analysis, and use the prior images for temporal analysis. After processing the current image, the blockage detection module may proceed to the next image subsequent to the current image, treat the next image as the "new-current image", treat the then-current image as one of the prior images of the new-current image, and repeat the blockage detection process on the new-current image.

In some embodiments, in the blockage detection process, the blockage detection module may first perform the "dividing images into units" operation 210 to divide a current image 201 into a set of non-overlapped rectangular processing units (PUs) 211. Each processing unit ("PU") may contain a fixed number of two-dimensional pixels (e.g., M×N pixels, wherein M denotes a number of horizontal pixels, and N denotes a number of vertical pixels). After the current image 201 is divided into a set of PUs 211, each of the PUs 211 may be associated with (e.g., contain image data from) a specific area on the current image 201, and may correspond to a specific portion of the camera's field-of-view. In other words, each PU 211 may be assigned with a unique two-dimensional coordinate (X, Y) representing its location with respect to the current image 201. For example, an image having 1024×768 pixels may be divided into 1,024 number of PUs each of which having a size of 32×24 pixels, and a PU having a coordinate of (2, 3) may be located at the third column and fourth row among the two-dimensional PUs 211. Alternatively, each PU may have a square shape having N×N pixels in size.

In some embodiments, after the current image 201 is divided into PUs 211, the blockage detection module may perform the "identifying unblocked units" operation 220 on the PUs 211, in order to detect the unblocked PUs from all of the PUs 211. A "blocked" PU may refer to a PU having image data that are caused by camera blockage. In comparison, an "unblocked" PU may refer to a PU containing image data that are NOT due to any camera blockage. Specifically, the blockage detection module may identify unblocked PUs by measuring the amount of graphical feature information contained in each of the PUs 211, and by collecting local statistical feature information among the PUs 211. Afterward, the blocked PUs may be derived from those unblocked PUs among all the PUs 211. Alternatively, the blockage detection module may identify the blocked PUs first, and derive the unblocked PUs from those blocked PUs among all the PUs 211.

In some embodiments, the blockage detection module may identify unblocked PUs in the PUs 211 by performing, among other operations, a "local blur measuring operation" 221, a "local background modeling" operation 223, and/or a "road surface identifying" operation 225. In the local blur measuring operation 221, the blockage detection module may identify the blocked PUs by conducting a local blur measurement (by generating a feature value) on each of the PUs 211. The local blur measurement, or graphical "feature value", may be used to evaluate the amount of graphic details in a PU. Further, the blockage detection module may extract "histogram information" from the feature values of all the PUs, and establish a dynamic "feature value threshold" that is based on the extracted histogram information.

In some embodiments, the blockage detection module may identify whether the specific PU is a blocked PU by comparing its feature value with the feature value threshold. Specifically, if a specific PU's feature value is higher than the feature value threshold, it may indicate that the specific PU contains a high amount of graphical details, and is more likely to be an unblocked PU. In comparison, if the specific PU's feature value is lower than the feature value threshold, it may signify that the specific PU may contain blurred foreground area, indicative of the specific PU being a blocked PU.

In some embodiments, the blockage detection module may determine the feature value of a specific PU by calculate an entropy value of the specific PU. For instance, the blockage detection module may utilize the following Shannon entropy calculation to generate a pixel intensity value (i.e., feature value) based on all the pixels contained in the specific PU.

$$H(x) = \sum_{i=1}^{n} P(x_i)I(x_i) = -\sum_{i=1}^{n} P(x_i)\log_2 P(x_i)$$

where n is the number of histogram bins and P is probability mass function which is estimated by taking the histogram values divided by the total number of pixels in the specific PU. A low feature value may indicate less amount of graphical information and higher level of blur in the specific PU.

In some embodiments, after determining the feature values for all the PUs 211, the blockage detection module may establish a dynamic "feature value threshold" that is tailored to the specific image. In other words, the PUs 211 may dynamically be used to generate a corresponding histogram threshold for evaluating against the feature values of the PUs 211.

Figure 3:
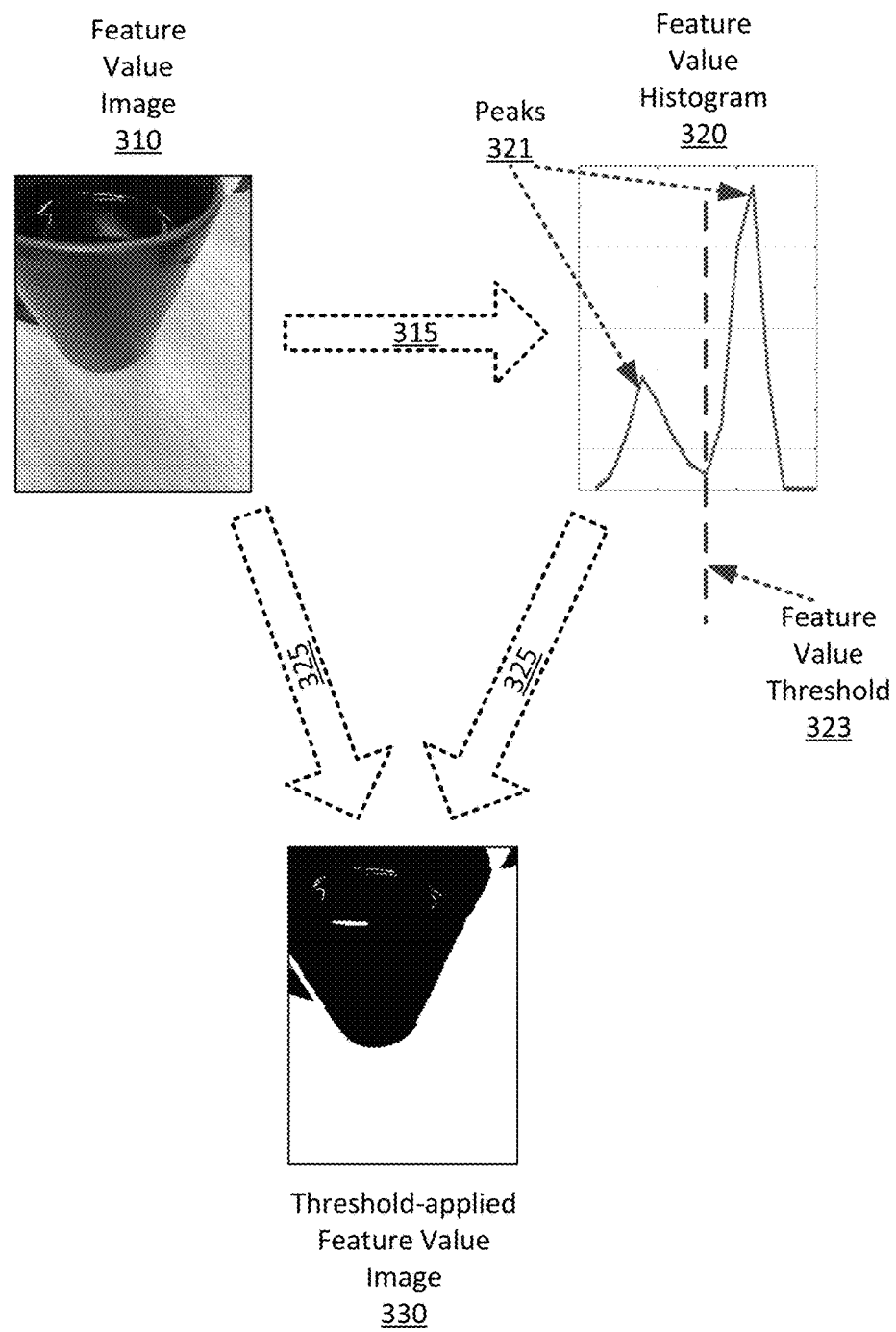
FIG. 3 illustrates a process to determine a feature value threshold for evaluating processing units.

FIG. 3 illustrates a process to determine a feature value threshold for evaluating processing units, in accordance with one or more embodiments of the present disclosure. In FIG. 3, the blockage detection module may generate a feature value image 310 based on the PUs divided from an original image. Specifically, each pixel in the feature value image 310 may represent a statistical feature value calculated based on a specific PU, and the location of such pixel in the feature value image 310 may correspond to the location of the specific PU in the original image. To generate the feature value image 310, the blockage detection module may convert each feature value into one of the pixel values within a scaled pixel value range (e.g., from 0 to 255). The generated feature value image 310, although not the same as the original image, may nevertheless provide a representation of the feature-value variations in the original image.

In some embodiments, the blockage detection module may generate (315) a feature value histogram 320 based on the feature value image 310. The feature value histogram 320 may show the distribution of feature values in the feature value image 310, and may be seem as a graphical representation of the tonal distribution in the feature value image 310. If there are two dominant modes (e.g., two peaks 321) characterizing the feature value histogram 320, the blockage detection module may deem the feature value histogram 320 a "bimodal histogram", and the valley between the 2 peaks 321 may be selected as the feature value threshold 323 for segmenting the PUs. Thus, the above 2-mode method may be used to adaptively select a feature value threshold 323.

In some embodiments, the calculated feature value threshold 323 may be clamped at a range based upon pre-knowledge of the feature values to limit the effect of atypical cases. If the original image contains high amount of details evenly distributed in different areas, the feature value histogram 320 generated may appear to have a single peak instead of two peaks. In this case, there may not be a reasonable value representing a feature value threshold that can be used to distinguish blocked and unblocked PUs. Thus, when the above atypical case is detected, the blockage detection model may use a predefined threshold as the feature value threshold 323, instead of generating a dynamic feature value threshold 323 that may be either too high or out of a reasonable range.

In some embodiments, the blockage detection module may apply (325) the feature value threshold 323 onto the feature value image 310, resulting a threshold-applied feature value image 330, In the threshold-applied feature value image 330, any pixels having corresponding feature values below the feature value threshold 323 may be shown as a white pixel, and any pixels having corresponding feature values above the feature value threshold 323 may be shown as a black pixel. Thus, the resulting threshold-applied feature value image 330 may show a grid being divided into a foreground with low entropy features and a background with high entropy details. In addition, after dynamically generating the feature value threshold 323, the blockage detection module may compare the feature value of a specific PU with the feature value threshold 323. And if the feature value is higher than the feature value threshold 323, the specific PU may be deemed an unblocked PU.

Referring back to FIG. 2. After identifying the unblocked PUs from all the PUs 211, the blockage detection module may further adjust a blockage unit map 203 which is used to take the spatial information into future considerations. Specifically, the "blockage unit map" may be a data storage which contains the same number of entries as the number of PUs extracted from each image 201. Each "entry" in the blockage unit map 203 may correspond to a specific coordinate in the PU. In other words, for different PUs that are divided from multiple images 201 but have the same corresponding coordinate, these PUs may be associated with the same entry in the blockage unit map 203. Further, each entry may be used to store a "blockage counter value" associated with such coordinate. Thus, the blockage detection module may consider both temporal correlations as well as spatial relationships among the various local regions in different images. And the blockage counter value may be computed as a function of the blockages in the current image and also the historic information contained in the prior images.

Figure 4:
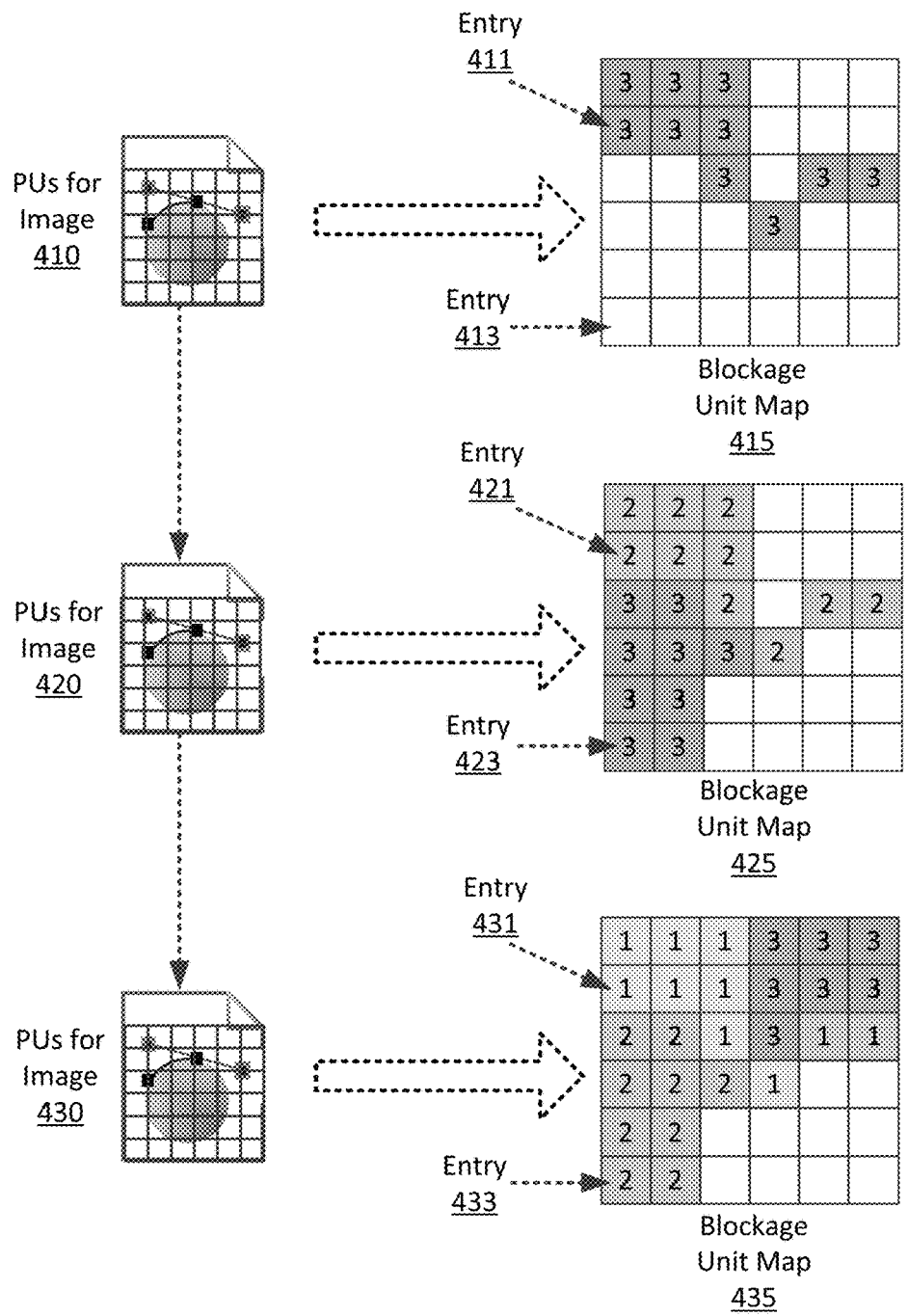
FIG. 4 illustrates a process to maintain a blockage unit map during the processing of multiple images.

FIG. 4 illustrates a process to maintain a blockage unit map during the processing of multiple images, in accordance with one or more embodiments of the present disclosure. In FIG. 4, a blockage detection module may sequentially process images 410, 420 and 430 for identifying unblocked PUs. The images 410, 420, and 430 may be generated at times t1, t2, and t3, and may be divided into corresponding PUs. After processed each of the images 410, 420 and 430, the blockage detection module may adjust once the blockage unit map based on the unblocked PUs identified therein. Thus, the blockage unit map 415 may show a first outcome after the blockage detection module processed the PUs for image 410, the blockage unit map 425 may show a second outcome after the processing of the PUs for image 420, and the blockage unit map 435 may show a third outcome after the processing of the PUs image 430. To clarify, the blockage unit maps 415, 425, and 435 are used to show the different states of a single blockage unit map throughout times t1, t2, and t3.

In some embodiments, since each entry in the blockage unit map is associated with a specific coordinate indicative of a specific area on an image, then all PUs that are associated with this specific coordinate may also be associated with this entry. In this case, the blockage detection module may utilize an entry's blockage counter value to indicate whether graphical details have been present in this area of the image during a period of time that lasted through multiple images. Specifically, when a PU which is associated with an entry in the blockage unit map is identified as unblocked, the blockage detection module may assign a high value to this entry's blockage counter value. Subsequently, when another PU which is associated with the same entry in the blockage unit map is not identified as unblocked, the blockage detection module may decrease the entry's blockage counter value. The idea is that a vehicle's camera may capture different details through different times, and the blockage unit map's purpose is to blend the image data captured at different times to present a temporal overview of the image data.

In FIG. 4's examples, each image may be divided into 6×6 PUs, and each blockage unit map may contain 6×6 entries corresponding to the 6×6 number of PUs in the images. After the processing of the PUs for image 410, assuming the image 410 is the first image, the blockage detection module may initialize the blockage counter values in the blockage unit map 415 by assigning a high initial value of "3" for any PUs that are identified as unblocked, while initializing the remaining blockage counter values in the blockage unit map 425 with a value "0". For example, entry 411, which may be associated with an unblocked PU in the image 410, may be initialized with a blockage counter value of "3", and entry 413, which may be associated with a PU in the image 410 that is not identified as unblocked, may be initialized with a blockage counter value of "0". For simplicity purposes, the blockage counter values having a value "0" are not displayed in FIG. 4's blockage unit maps.

In some embodiments, after the processing of the PUs for image 420, the blockage detection module may adjust the blockage unit map 425 by assigning the blockage counter values to an initial value of "3" for entries that are associated with any unblocked PUs in the image 420, and decreasing the non-zero blockage counter values for entries that are NOT associated with any unblocked PUs in the image 420. For example, entry 423, which has a blockage counter value of "0" in the blockage unit map 415, may be assigned with a blockage counter value "3" if its associated PU in the image 420 is identified as an unblocked PU. Entry 421, which has an initial blockage counter value of "3" (as shown by entry 411), may have its blockage counter value decreased by 1 to "2" in the blockage unit map 425 if its associated PU in the image 420 is NOT identified as an unblocked PU.

Likewise, after the processing of the PUs for image 430, the blockage detection module may adjust the blockage unit map 435 again by assigning the blockage counter values to an initial value of "3" for entries that are associated with any unblocked PUs in the image 430, and decreasing the non-zero blockage counter values for entries that are NOT associated with any unblocked PUs in the image 430. For example, entries 431 and 433 may have their blockage counter values decreased by 1 in the blockage unit map 435 when their associated PUs in the image 430 are not identified as unblocked PUs. Thus, the blockage unit map 435 may show the outcome after the results of processing the PUs from three images 410, 420, and 430 are blended together. In this case, the entries having corresponding blockage counter values being "0" may subsequently be treated as candidate blocked regions.

Referring back to FIG. 2. In some embodiments, the blockage detection module may identify the unblocked PUs by perform a "local background modeling" operation 223 on those PUs 211 that are generated based on prior images 201. Specifically, the local background modeling, or background subtraction, is used to segment moving objects/foreground from static background in an image scene. The blockage detection module may utilize the local background modeling operation 223 to obtain blocked (static and blurry) PUs at the local statistical feature level. Further, the local background modeling operation 223 may be performed in lieu of, or in addition to, the local blur measuring operation 221.

In some embodiments, the blockage detection module may utilize a codebook background modeling approach by configuring 3 codebook boxes/entries that cover the feature values of the PUs 211 from images captured over a specific period of time (e.g., 10 seconds). As described above, the feature values may be entropy values calculated based on the PUs 211. For each codebook entry/box, the blockage detection module may keep track of the statistics (e.g., min, max, or mean) and variances of the feature values, last update time, number of times that the input falls into this entry/box, etc.

Figure 5:
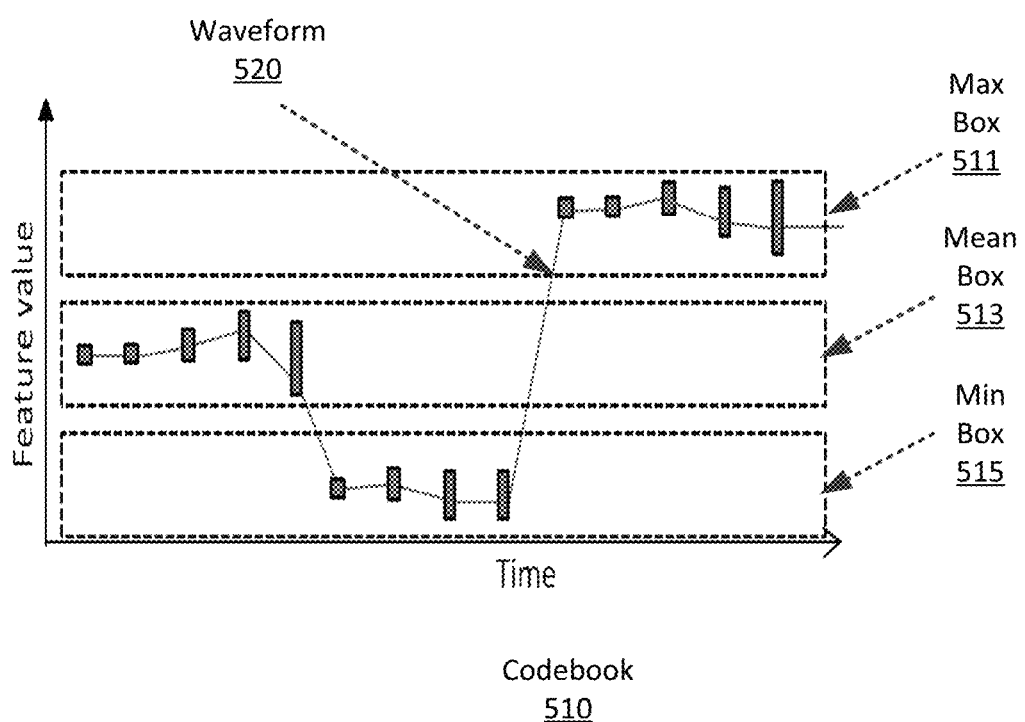
FIG. 5 illustrates the formation of a codebook.

FIG. 5 illustrates the formation of a codebook, in accordance to certain embodiments of the present disclosure. In FIG. 5, the blockage detection module may construct a codebook 510 having 3 codebook boxes/entries 511, 513, and 515. The codebook box 511 may be used to record maximum feature values collected from the PUs, the codebook box 513 may include mean/average feature values of the PUs, and the codebook box 515 may hold minimum feature values of the PUs. For identifying blocked/blurred PUs, the blockage detection module may use the minimum codebook box 515 of the codebook 510 with the constraint that it has been recently updated to obtain a "background model". In other words, the "background model" may be constructed based on PUs having the lowest feature values. Also, the waveform 520 for the blocked PUs, which may be derived based on "feature values vs. time", may not exhibit positive spikes but instead may contain some negative valleys.

Referring back to FIG. 2. In some embodiments, the blockage detection module may identify unblocked PUs in the PUs 211 by evaluating the differences between the feature values of the PUs 211 with the background model generated by the local background modeling operation 223. If the feature value of a specific PU is within a range defined by a minimum codebook box, then the specific PU may be identified as a blocked PU. Alternatively, if the differences between the feature values and the background model are greater than a predefined threshold (such threshold may be defined by the codebook's configuration), then those PUs having feature values higher than the threshold may be considered as unblocked PUs. Afterward, the blockage detection module may adjust the blockage unit map 203 (by increasing or decreasing its blockage counter values) based on the identified unblocked PUs, as illustrated above.

In some embodiments, the blockage detection module may further identify the unblocked PUs by perform a "road surface identifying" operation 225 on those PUs 211. Specifically, the blockage detection module may utilize the background model generated by the local background modeling operation 223 to identify road surface having multiple features available. In some cases, road surface generally lacks details and the values of the statistical features may be relatively low and relatively consistent through time, which may cause false-positives in blockage identification.

Figure 6:
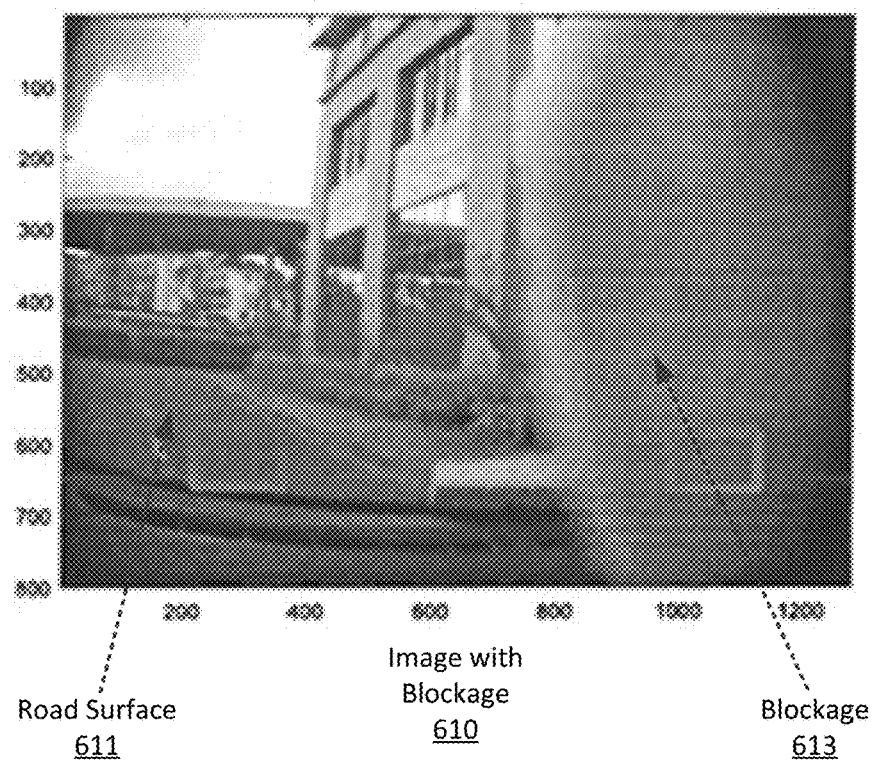
FIG. 6 shows an exemplary image with blockage and exemplary waveforms generated based on the image.
Figure 6:
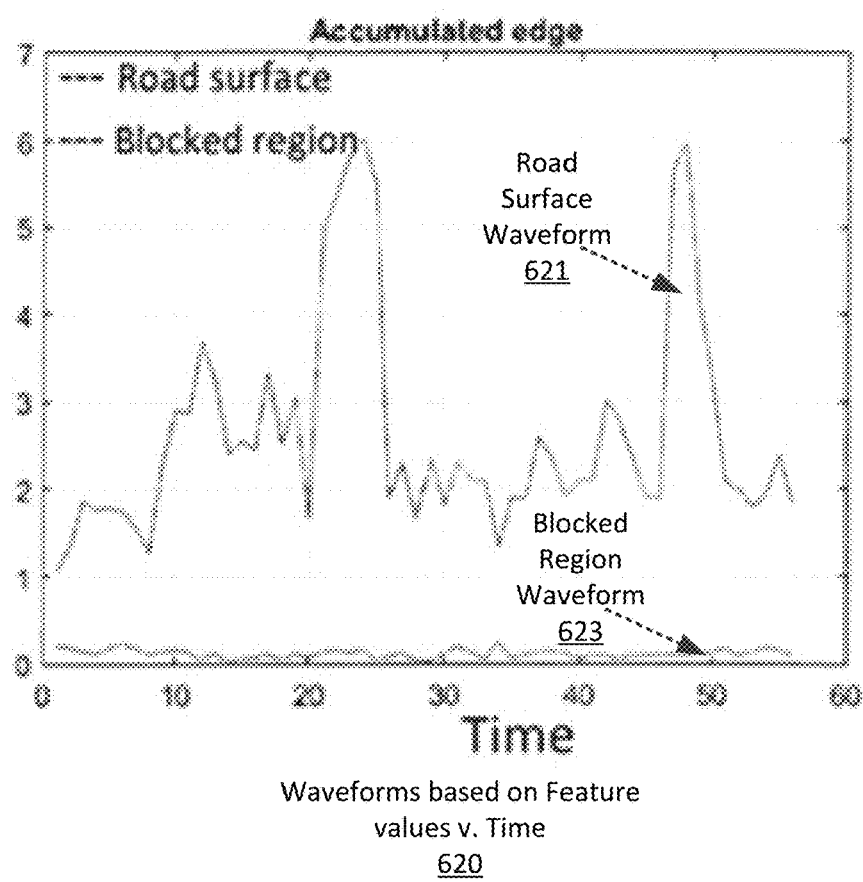

FIG. 6 shows an exemplary image with blockage and exemplary waveforms generated based on the image, in accordance with certain embodiments of the present disclosure. In FIG. 6, the image 610 may have a blockage 613 that is partially blocking its right-side portion. The image 610 may also show a road surface 611. At a specific time, the blurry image data related to road surface 611 may be similar to that of the blockage 613. Based on the background model, the blockage detection module may generate waveforms 620 by evaluating the feature values vs. time of the PUs. The waveforms 620 may include two waveforms 621 and 623, with the waveform 621 being associated with road surface 611 of the image 610, and the waveform 623 being associated with the blockage 613 of the image 610.

In some embodiments, the road surface waveform 621 may show a lot of positive peaks and valleys, which may be caused by road surface features such as lane markers and traffic instructions. In comparison, the blocked region waveform 623 may be relatively flat with no noticeable peaks or valleys. Thus, when a certain set of PUs are showing low feature values, the blockage detection module may generate a waveform based on the PUs, and analyze the waveform for peaks and valleys. If the waveform has a characteristic that is similar to the waveform 621, then the blockage detection module may deem the PUs (including those that have previously been identified as blocked PUs) as unblocked PUs. Otherwise, if the waveform is more similar to the waveform 623, the blockage detection module may treat the PUs as blocked PUs.

In some embodiments, if a specific PU having low feature value but is identified as unblocked, the features of that PU shall be compared to its adjacent PUs. In other words, if there is one PU being identified as unblocked road surface, the unblocked regions should grow/dilate from this one PU to other PUs which exhibit similar feature values, allowing the identifying the entire road surface in the image. Specifically, the feature value of an unblocked road-surface PU may be deemed a "reference value", and any adjacent/nearby PUs (including those that have previously been identified as blocked PUs) having corresponding feature values that are within a predetermined range of the reference value may be identified/categorized as from road surface and unblocked as well. Such an approach may lower the false-positive blockage detection caused by road surface. It should be noted that multiple features may be necessary to identify similar patterns of road surface reliably.

Referring back to FIG. 2. In some embodiments, the blockage detection module may selectively perform the operations 221, 223, and 225 in order to identifying unblocked PUs. Specifically, the blockage detection module may perform one (or more) of the three operations 221, 223, and 225 in various sequence or order. For example, the blockage detection module may utilize operation 221 to identify a set of unblocked PUs from all the PUs 211, does not utilize operation 223, and then utilize operation 225 to change some of the PUs that have been previously identified as blocked in operation 221 to unblocked PUs. Alternatively, the blockage detection module may perform operation 223 first, and then perform 225 subsequently without performing operation 221. In other words, the blockage detection module may utilize the operations 221, 223, and 225 to identifying unblocked PUs, identifying blocked PUs, changing previously-identified unblocked PUs to blocked PUs, or changing previously-identified blocked PUs to unblocked PUs.

In some embodiments, after the unblocked PUs are identified in a specific image 211, the blockage detection module may perform the "forming candidate blocked regions" operation 230 based on the unblocked PUs and the derived blocked PUs. Specifically, the blockage detection module may extract the entries in the blockage unit map 203 that have blockage counter values equaling to "0", and cluster those PUs that are associated with these entries into candidate blocked regions. In other words, a "candidate blocked region" may include a set of PUs which are close in proximity in the PUs 211 and are deemed blocked based on the spatial and temporal processing as described above. In other words, the blockage detection module may determine that the image data contained in a candidate blocked region may be caused by blockages in the camera's field-of-view, and may therefore be a candidate for further blockage detection.

In some embodiments, the blockage detection module may cluster the deem-blocked PUs into candidate blocked regions by performing a connected component labeling (CCL) operation based on these PUs' physical proximity and blurriness. The blockage detection module may utilize this approach for the growing/dilating of the unblocked road surface regions as described above.

In some embodiments, the blockage detection module may perform "tracking candidate blocked regions" operation 240 based on the candidate blocked regions identified in operation 230, in order to identify region-associations existing among the candidate blocked regions. The blockage detection module may perform, among other operations, a region associating operation 241 and a region association updating operation 243 to track the candidate blocked regions throughout time.

In some embodiments, the blockage detection module may maintain and utilize a blockage region map 245 containing multiple region trackers each of which tracks one or more candidate blocked regions identified from the images. Each "region tracker" may be used to track a set of candidate blocked regions that are identified from multiple images and have region-associations based on, among other factors, spatial proximity, size, and/or time. A "region-association" among multiple candidate blocked regions may refer to a relationship in time, size, and spatial proximity among these candidate blocked regions as they are presented in the plurality of images. In other words, when multiple candidate blocked regions identified from their respective images are deemed to have a region-association, the blockage detection module may treat these candidate blocked regions as having been caused by the same blockage in the camera's field-of-view, and utilize a single region tracker to track these candidate blocked regions.

Further, each region tracker may also contain a "blockage score" indicating a confidence evaluation (or a likelihood) of the tracked set of candidate blocked regions being blocked. In other words, the blockage score may serve as the "age" of the candidate blocked regions. And a high blockage score may indicate that the tracked set of candidate blocked regions are more likely to be blocked for a long time and are therefore troublesome, while a low blockage score may show that the tracked set of candidate blocked regions may be unblocked or blocked for a short period of time, and may not be alarming yet.

In some embodiments, each region tracker may further contain additional candidate blocked region parameters such as area, location, life factor. The "area" parameter may refer to a number of connected blocked PUs, i.e., the size of the blocked regions. The "location" parameter is used to store the spatial proximity the candidate blocked regions may be located on the image, and may be useful for certain application scenario considerations. For example, based on camera calibration information, the location parameter may indicate the candidate blocked regions may be on the top of the image, which may contain less relevant information (e.g., sky information). The "life factor" parameter may be indicative of the duration of the candidate blocked regions being presents in multiple images.

In some embodiments, during the region associating operation 241, the blockage detection module may evaluate each of the current candidate blocked regions identified in operation 230 against the existing candidate blocked regions that were previously identified based on prior images and are currently tracked in the blockage region map 245. If an existing candidate blocked region is determined to be similar in spatial proximity, size, and time with respect to the current candidate blocked region, the blockage detection module may identify a region-association between the existing candidate blocked region and the current candidate blocked regions. In this case, the blockage detection module may use the region tracker in the blockage region map 245 corresponding to the existing candidate blocked region for tracking the current candidate blocked region. Alternatively, if the blockage detection module cannot identify any existing candidate blocked region for region-associating with the current candidate blocked region, it may create a new region tracker in the blockage region map 245 to initialize new tracking of the current candidate blocked region.

In some embodiments, during the "region association updating" operation 243, the blockage detection module may adjust the blockage scores associated with the region trackers in the blockage region map 245. Specifically, if the blockage detection module identifies a region-association in the operation 241, it may increment the blockage score contained in the corresponding region tracker, and lower the blockage scores for any other region trackers in the blockage region map 245 that do not have any region-association with any current candidate blockage regions. In some embodiments, the blockage detection module may increment the blockage scores linearly, and decrease the blockage scores non-linearly (or exponentially).

In some embodiments, the blockage detection module may periodically perform the "evaluating blockage scores" 250 to assess the blockage scores contained in the blockage region map 245. When detecting any blockage score that is above a predetermined tracker threshold, the blockage detection module may generate an alarm signal 203 for the vehicle to trigger a warning and other fault handling mechanisms. Alternatively, the blockage detection module may generate the alarm signal 203 when more than a fixed number of blockage scores in the blockage region map 245 are above the predetermined tracker threshold.

Figure 7:
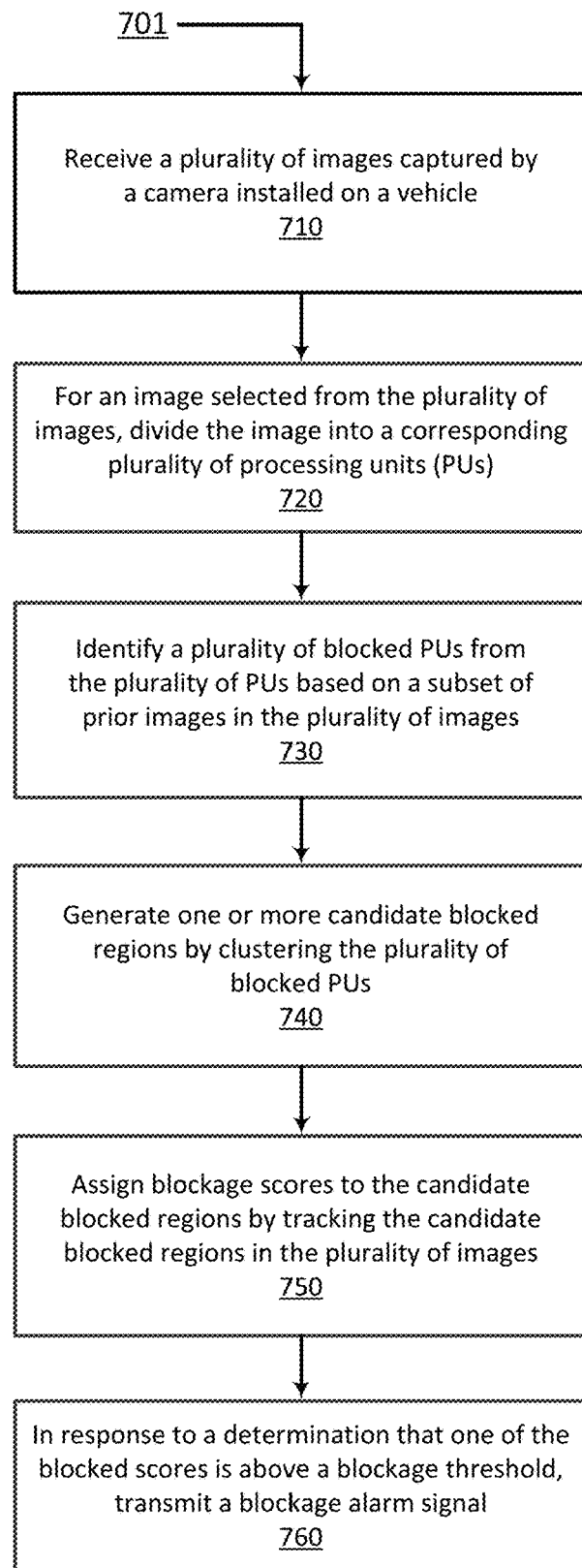
FIG. 7 a flow diagram illustrating a process for detecting blockages in images, all according to one or more embodiments of the present disclosure.

FIG. 7 shows a flow diagram illustrating a process for detecting blockages in images, according to one or more embodiments of the present disclosure. The processes 701 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 7 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 710, a blockage detection module may be configured to receive a plurality of images captured by a camera installed on a vehicle. The blockage detection module may be configured to identify one or more candidate blocked regions in the plurality of images, based on the following operations. Each of the candidate blocked regions may contain image data caused by blockages in the camera's field-of-view.

At block 720, the blockage detection module may be configured to process each one of the plurality of images. Specifically, for each image selected from the plurality of images, the blockage detection module may divide the image into a corresponding plurality of processing units (PUs).

At block 730, the blockage detection module may identify a plurality of blocked PUs from the plurality of PUs based on a subset of prior images in the plurality of images that are captured prior to the image. Specifically, the image may be deemed a current image, and the subset of prior images may be those images selected from the plurality of images and captured prior to the current image.

In some embodiments, the blockage detection module may generate a feature value image based on feature values extracted from the plurality of PUs. The blockage detection module may then generate a feature value threshold based on a histogram of the feature value image. Afterward, the blockage detection module may compare each PU's feature value with the feature value threshold. For a specific PU in the plurality of PUs, in response to a determination that the PU's corresponding feature value is above the feature value threshold, the blockage detection module may identify the specific PU as an unblocked PU.

In some embodiments, the blockage detection module may generate a codebook based on the set of prior images. The codebook may include a maximum codebook box, a mean codebook box, and a minimum codebook box which respectively containing maximum, mean, and minimum feature values extracted from the set of prior images. For a specific PU selected from the plurality of PUs, the blockage detection module may compare the specific PU's feature value with the minimum codebook box. In response to a determination that the specific PU's feature value is within the minimum codebook box's range, the blockage detection module may identify the specific PU as one of the blocked PUs. Alternatively, the blockage detection module may select a specific PU from the plurality of PUs that have not been previously identified as an unblocked PU, and perform the above codebook box comparison. If this specific PU's feature value is within the minimum codebook box's range, the blockage detection module may identify the specific PU as one of the blocked PUs.

In some embodiments, when there are PUs that are previously identified as unblocked road surfaces, the blockage detection module may generate a road-surface waveform based on these unblocked road-surface PUs' reference values, and compare other PUs' reference values with this road-surface waveform. In other words, for a specific PU selected from the plurality of PUs, in response to a determination that the specific PU's feature value is within a predetermined range of the road-surface waveform, the blockage detection module may identify the specific PU as an unblocked PU. After identifying the unblocked PUs, the blockage detection module may identify the plurality of blocked PUs based on unblocked PUs in the plurality of PUs.

In some embodiments, when there is a previously identified unblocked PU, the blockage detection module may generate a reference value based on this unblocked PU's reference value, and compare other PUs' reference values with this reference value. In other words, for a specific PU selected from the plurality of PUs, in response to a determination that the specific PU's feature value is within a predetermined range of a reference value generated based on a previously identified unblocked PU, the blockage detection module may identify the specific PU as an unblocked PU. After identifying the unblocked PUs, the blockage detection module may identify the plurality of blocked PUs based on unblocked PUs in the plurality of PUs. Alternatively, the blockage detection module may select a specific PU from the plurality of PUs that have been previously identified as blocked PUs, and perform the above codebook box comparison. If this specific PU's feature value is within the minimum codebook box's range, the blockage detection module may identify the specific PU as one of the blocked PUs.

In some embodiments, the blockage detection module may maintain a blockage unit map based on the set of prior images. The blockage unit map contains a plurality of entries each of which corresponds to one of the plurality of PUs. The blockage detection module may adjust the plurality of entries based on a plurality of unblocked PUs identified from the plurality of PUs. Afterward, the blockage detection module may generate the plurality of blocked PUs based on the plurality of entries having corresponding counter values that are below a predetermined counter threshold.

At block 740, the blockage detection module may cluster the plurality of blocked PUs into the one or more candidate blocked regions. Specifically, the blockage detection module may utilize a connected component labeling (CCL) process to cluster the plurality of blocked PUs into the one or more candidate blocked regions.

At block 750, the blockage detection module may assign blockage scores to the candidate blocked regions based on the region-associations among the one or more candidate blocked regions in the plurality of images. Specifically, the blockage detection module may generate a blockage region map based on the candidate blocked regions. The blockage region map may contain a plurality of region trackers each of which corresponds to one of the candidate blocked regions and is associated with a blockage score. The blockage detection module may use the plurality of region trackers to identify region-associations among the candidate blocked regions based on their respective spatial proximity, size, and time in the plurality of images. Further, the blockage detection module may adjust the blockage scores in the plurality of region trackers based on the region-associations among the candidate blocked regions.

At block 760, in response to a determination that one of the blockage scores is above a predetermined blockage threshold, the blockage detection module may transmit a blockage alarm signal to the vehicle.

Thus, systems and methods for detecting blockage in images have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A method comprising:
identifying, based at least on image data corresponding to a plurality of images captured using a camera, candidate blocked regions in the plurality of images, wherein at least one candidate blocked regions being caused by one or more blockages in a field-of-view of the camera;
determining whether to maintain or create a region tracker in a blockage region map for tracking the at least one candidate blocked region based at least on relationships between the at least one candidate blocked region and others of the candidate blocked regions;
determining camera blockage information based at least on the region tracker; and
in response to a determination that the camera blockage information indicates that camera blockage is above a predetermined blockage threshold, performing one or more operations based at least on the camera blockage information.

2. The method as recited in claim 1, wherein the identifying the candidate blocked regions comprises:
dividing a current image selected from the plurality of images into a plurality of processing units (PUs);
identifying at least one blocked PU from the plurality of PUs based at least on a set of prior images in the plurality of images that are captured prior to the current image; and
clustering the at least one blocked PU into the candidate blocked regions.

3. The method of claim 1, further comprising:
determining that the at least one of the candidate blocked region lacks a region-association with any of the others of the candidate blocked regions; and
creating the region tracker in the blockage region map.

4. The method of claim 3, wherein the plurality of images include a set of prior images that are captured prior to a current image, and the method further comprises:
identifying the others of the candidate blocked regions based at least on the set of prior images.

5. The method of claim 1, wherein the region tracker includes a score indicative of an evaluation of the at least one candidate blocked region being blocked.

6. The method of claim 5, further comprising:
identifying a region association between the at least one candidate blocked region and the others of the candidate blocked regions; and
adjusting the score associated with the region tracker based at least on the region association.

7. The method of claim 1, wherein the region tracker includes parameter information corresponding to the at least one candidate blocked region.

8. One or more processors comprising processing circuitry to perform operations comprising:
identifying, based at least on image data corresponding to a plurality of images captured using a camera, candidate blocked regions in the plurality of images, at least one candidate blocked region being caused by blockages in a field-of-view of the camera;
determining whether to maintain or create a region tracker in a blockage region map for tracking the at least one candidate blocked region based at least on relationships between the at least one candidate blocked region and others of the candidate blocked regions;
determining camera blockage information based at least on the region tracker; and
in response to a determination that the camera blockage information indicates that camera blockage is above a predetermined blockage threshold, performing one or more operations based at least on the camera blockage information.

9. The one or more processors of claim 8, wherein the operations further comprise:
determining that the at least one candidate blocked region lacks a region-association with any of the others of the candidate blocked regions; and
creating the region tracker in the blockage region map.

10. The one or more processors of claim 9, wherein the plurality of images include a set of prior images that are captured prior to a current image, and the operations further comprise:
identifying the others of the candidate blocked regions based on the set of prior images.

11. The one or more processors of claim 8, wherein the region tracker includes a score indicative of an evaluation of the at least one candidate blocked region being blocked.

12. The one or more processors of claim 11, wherein the operations further comprise:
identifying a region association between the at least one candidate blocked region and the others candidate blocked regions; and
adjusting the score associated with the region tracker based at least on the region association.

13. The one or more processors of claim 8, wherein the region tracker includes parameter information of the at least one candidate blocked region.

14. The one or more processors of claim 8, wherein the identifying the candidate blocked regions comprises:
dividing a current image selected from the plurality of images into a plurality of processing units (PUs);
identifying one or more blocked PUs from the plurality of PUs based at least on a set of prior images in the plurality of images that are captured prior to the current image; and
clustering the one or more blocked PUs into the candidate blocked regions.

15. A system comprising:
a camera to capture a plurality of images; and
one or more processors comprising processing circuitry to:
identify candidate blocked regions in the plurality of images, at least one candidate blocked region corresponding to a blockage caused in a field-of-view of the camera,
determine whether to maintain or create a region tracker in a blockage region map for tracking the at least one candidate blocked region based at least on relationships between the at least one candidate blocked region and others candidate blocked regions,
determine camera blockage information based at least on the region tracker, and
in response to a determination that the camera blockage information indicates that camera blockage is above a predetermined blockage threshold, perform one or more operations using the system and based at least on the camera blockage information.

16. The system of claim 15, wherein the processing circuitry is further to:
determine that the at least one candidate blocked region lacks a region-association with any of the others candidate blocked regions; and
create the region tracker in the blockage region map.

17. The system as of claim 16, wherein the plurality of images include a set of prior images that are captured prior to a current image, and the processing circuitry is further to:
identify the others candidate blocked regions based at least on the set of prior images.

18. The system of claim 15, wherein the region tracker includes a score indicative of an evaluation of the at least one candidate blocked region being blocked.

19. The system of claim 18, wherein the processing circuitry is further to:
identify a region association between the at least one candidate blocked region and the others candidate blocked regions; and
adjust the score associated with the region tracker based at least on the region association.

20. The system of claim 15, wherein the region tracker includes parameter information of the at least one candidate blocked region.

* * * * *